United States Patent [19]
Saitoh et al.

[11] Patent Number: 5,414,471
[45] Date of Patent: May 9, 1995

[54] MOVABLE CURSOR FOR SELECTING AND EXCHANGING MAIN PICTURE AND SUB PICTURE IN MULTI-PICTURE DISPLAY DEVICE

[75] Inventors: Mitsumasa Saitoh; Shigeyuki Sano; Katsumi Kuwabara, all of Kanagawa, Japan

[73] Assignee: Sony Corporation, Tokyo, Japan

[21] Appl. No.: 11,420

[22] Filed: Jan. 29, 1993

[30] Foreign Application Priority Data

Feb. 18, 1992 [JP] Japan ................................ 4-061021

[51] Int. Cl.⁶ ............................................. H04N 5/45
[52] U.S. Cl. .................................... 348/565; 348/589; 348/588; 348/601; 348/734; 345/145
[58] Field of Search .................. 358/183, 181, 194.1, 358/192.1, 22, 230; 345/145, 146, 115, 119, 157; 348/348, 564, 565, 566, 579, 580, 583, 584, 588, 589, 739, 734, 706, 569, 570, 596, 600, 601; H04N 5/445, 5/45, 5/50, 9/74, 9/76, 5/268

[56] References Cited

U.S. PATENT DOCUMENTS

| | | | |
|---|---|---|---|
| 4,746,983 | 5/1988 | Hakamada | 358/183 |
| 4,953,025 | 8/1990 | Saitoh et al. | 358/140 |
| 4,959,719 | 9/1990 | Strubbe | 358/183 |
| 5,091,785 | 2/1992 | Canfield et al. | |
| 5,146,210 | 9/1992 | Heberle | 358/194.1 |
| 5,157,511 | 10/1992 | Kawai | 358/183 |

FOREIGN PATENT DOCUMENTS

| | | | |
|---|---|---|---|
| 0267020 | 5/1988 | European Pat. Off. | H04N 5/445 |
| 0281677 | 9/1988 | European Pat. Off. | G09G 1/16 |
| 0413838 | 2/1991 | European Pat. Off. | H04N 5/445 |
| 0486989 | 5/1992 | European Pat. Off. | H04N 5/45 |
| 2646307 | 10/1990 | France | H04N 5/262 |
| 61-224786 | 10/1986 | Japan | H04N 5/46 |
| 62-21379 | 1/1987 | Japan . | |
| 62-024777 | 2/1987 | Japan | H04N 5/00 |
| 62-208768 | 9/1987 | Japan . | |
| 63-069373 | 3/1988 | Japan | H04N 1/21 |
| 01292984 | 5/1988 | Japan | H04N 7/01 |
| 63-169186 | 7/1988 | Japan | H04N 5/45 |
| 03149976 | 11/1989 | Japan | H04N 5/265 |
| 03154581 | 11/1989 | Japan | H04N 5/46 |
| 9119384 | 12/1991 | WIPO | H04N 5/262 |

OTHER PUBLICATIONS

K. Nakai, Channel Selection Simple with 9–Picture Television, vol. 27, No. 2 Journal of the Electronics Industry 59 (Feb. 1980).

*Primary Examiner*—James J. Groody
*Assistant Examiner*—Sherrie Hsia
*Attorney, Agent, or Firm*—Jay H. Maioli

[57] ABSTRACT

A picture selector includes a controller such as a mouse controller for controlling the movement of a cursor on a display screen of a display device capable of performing multi-picture display. The cursor on the display screen is moved onto a desired one of plural displayed picture frames by manipulation of the mouse controller, and then the mouse controller is clicked to display the desired picture frame as a main picture frame.

3 Claims, 2 Drawing Sheets

MOVABLE CURSOR FOR SELECTING AND EXCHANGING MAIN PICTURE AND SUB PICTURE IN MULTI-PICTURE DISPLAY DEVICE

BACKGROUND OF THE INVENTION

1. Field of the Invention

This invention relates to a picture selector and a method of selecting a desired picture from plural pictures for use in a display device, and particularly to a picture selector and a picture selecting method For use in a display device in which multi-picture display is carried out.

2. Description of Related Art

A picture selector technique has been known as a technique for performing a channel selection in a television receiver and a display picture selection in a display device. In this picture selector technique, plural picture frames are displayed and monitored on a display screen to suitably and rapidly select the channel of a desired picture frame The picture selector technique has various selection modes. As one of the display modes, as shown in FIG. 4, sub picture frames which are picture frames of programs on different channels are reductively displayed (picture frames 41 and 43) in such a manner that they arc arranged out of a master or main picture frame which is a picture frame of image-received channel (hereinafter referred to as "PoutP mode") or they are embedded into the main picture frame (hereinafter referred to as "PinP mode"), and a desired one of the programs on different channels is selected while checking the sub picture frames. As another mode, plural picture frames of different channels are reductively displayed on the screen in such a manner as to be arranged in a matrix or other form to perform a multi-channel display ( picture frame 42 ), that is the plural picture frames of different channels are simultaneously monitored to select a desired channel.

In order to select a desired sub picture frame in this type of conventional picture selector, it is required for a viewer to first check a multi-picture on a screen to fix a desired channel number in his memory, then return a currently-displayed picture frame to a main picture frame, and then push a channel selection key, or in PinP mode it is required for the viewer to take his eyes off the displayed picture frame once and then push a SWAP key or the like which is mounted on a remote controller.

SUMMARY OF THE INVENTION

An object of this invention is to provide a picture selector and a picture selecting method for use in a multi-picture display device in which a channel selecting operation can be easily facilitated.

In order to attain the above object, a picture selector includes a controller such as a mouse controller for controlling the movement of a cursor on a display screen of a display device capable of performing multi-picture display. The cursor on the display screen is moved onto a desired one of plural displayed picture frames by manipulation of the mouse controller, and then the mouse controller is clicked to display the desired picture frame as a main picture frame.

According to the picture selector thus constructed, a viewer moves a cursor onto a desired picture frame by the manipulation of the mouse controller while monitoring plural displayed picture frames, so that a desired picture or channel can be selected only by the click operation of the mouse controller.

DETAILED DESCRIPTION OF THE PREFERRED EMBODIMENTS

Figure 1:
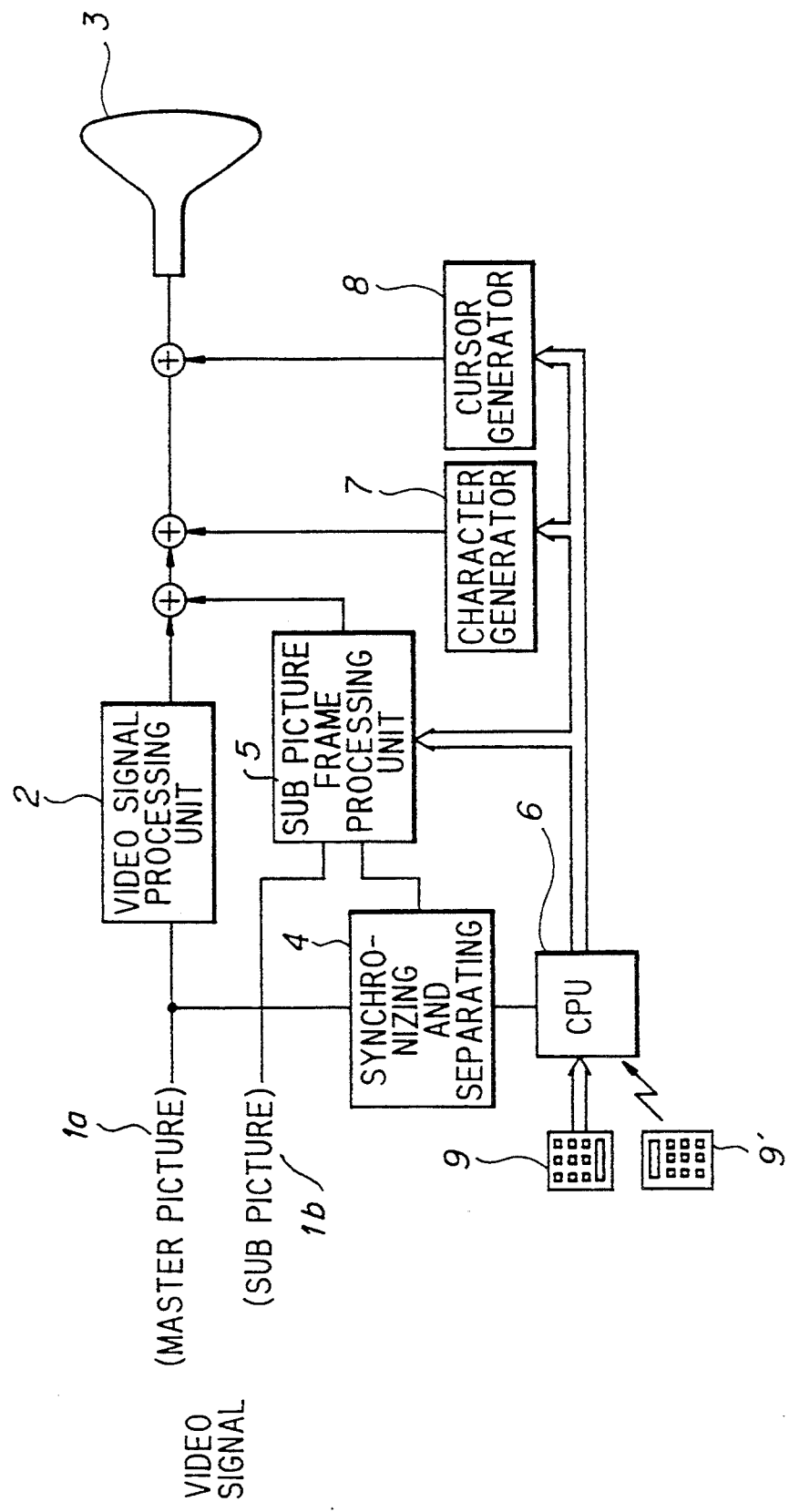
FIG. 1 is a block diagram of a video signal processing unit of a television image receiver capable of performing master/sub picture frame display operation, to which a picture selector of this invention is applied.

FIG. 1 is a block diagram of a video signal processing unit for a television image receiver capable of displaying master/sub picture frames using a picture selector of the invention. A reference numeral 1a represents video signals of master signals and a reference numeral 1b represents video signals of sub pictures which are supplied from broadcast receiving signals of VHF, UHF, BS, CS. etc. or from an external signal source, a reference numeral 2 represents a master-picture video signal processing unit, a reference numeral 3 represents a CRT display, a reference numeral 4 represents a synchronizing and separating unit, a reference numeral 5 represents a sub-picture processing unit, a reference numeral 6 represents a CPU, a reference numeral 7 represents a character generator, a reference numeral 8 represents a cursor generator, a reference numeral 9 represents a key input unit, and a reference numeral 9' represents a remote control input device.

Figure 2:
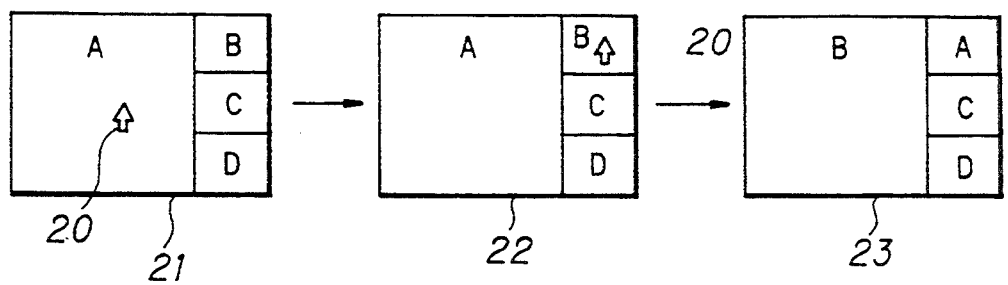
FIG. 2 is a schematic diagram of picture selection using a multi-picture display frame including a master picture frame and sub picture frames.

Now, as shown in FIG. 2, the master picture frame A which has been processed in the video signal processing unit 2 and the sub picture frames B, C and D which have been processed in the sub-picture processing unit S are displayed in a multi-display mode to display a multi-display picture frame 21 on the screen, and a cursor 20 is also superimposed on the picture frame 21 by the cursor generator 8. The positions of the sub picture frames B, C and D and the cursor 20 on the multi-display picture frame 21 are monitored by the CPU at all times, and the cursor 20 can be moved in any direction on the picture frame 21 by manipulating the key input unit 9 or the remote control input device 9'. For example, when the cursor 20 is moved onto the sub picture frame B as shown by a picture frame 22 and a click instruction is made at this state, the CPU 6 identifies a picture frame to be exchanged (i.e., a picture image to be newly displayed as a master picture frame) on the basis of the monitored position information of the picture frames, and outputs a master/sub picture frame exchange instruction to a related unit of the television image receiver so that the picture frame B is displayed as a master picture frame while the picture frame A is displayed as a sub picture frame as shown by a picture frame 23, thereby performing a picture frame selection.

Figure 3:
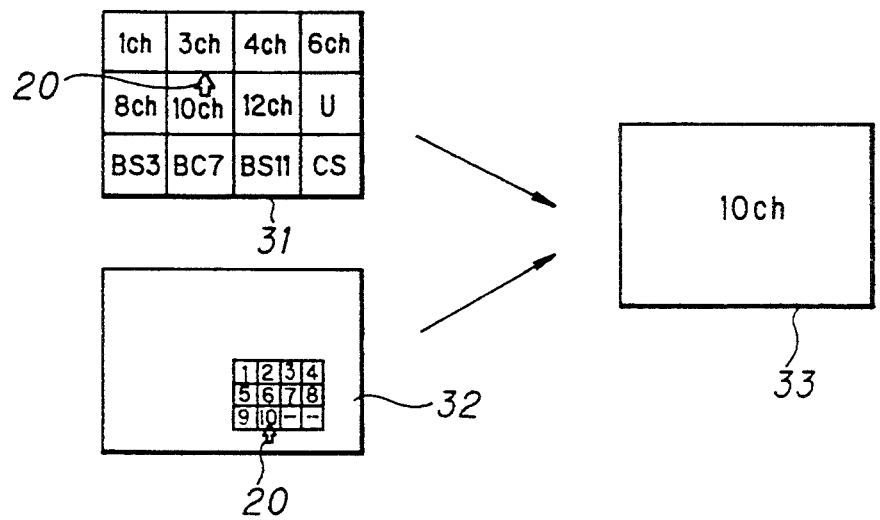
FIG. 3 is a schematic diagram of picture selection using another multi-picture display frame.
Figure 4:
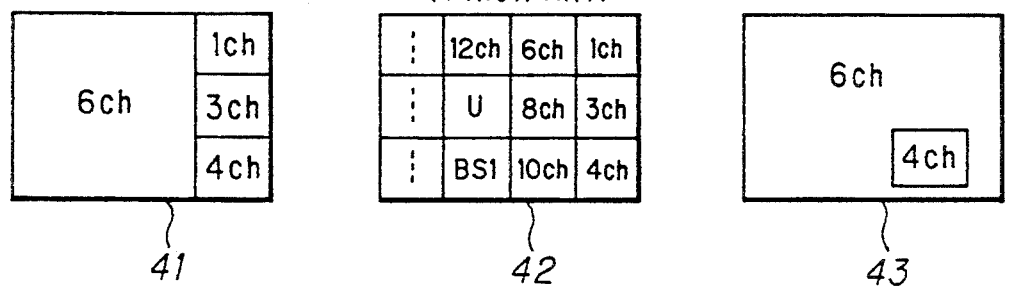
FIG. 4 is a schematic diagram explaining a multi-picture display frame.

FIG. 3 is an explanatory diagram of the picture frame selection using another multi-picture display frame. In this multi-display picture frame, plural picture frames of different channels are reductively and simultaneously displayed in a matrix form on the screen as shown by a picture frame 31 (in multi-channel display mode). When a tenth channel, for example, is indicated by the cursor 20 on the multi-channel display frame as described above, the picture frame of the tenth channel may be selected and displayed as a main picture frame.

Alternatively, a channel figure table 32 for sub picture frames may be superimposed on a main picture frame (in a channel-index display mode). In this case, when a tenth channel is indicated by the cursor 20, the picture frame of the tenth channel can be likewise selected as shown by a picture frame 33.

In the above display modes, a channel number for each picture frame on the multi-channel display frame or each channel figure of the channel figure table may be displayed using a character generator 7.

According to the picture selector of this invention as described above, a desired picture or channel can be easily and properly selected while seeing the multi-displayed frame.

What is claimed is:

1. A picture selector for use in a display device in which a main picture frame and one of a channel figure table and a plurality of additional picture frames are simultaneously displayed on a screen, comprising:
    character generating means for generating and displaying on the screen the channel figure table comprising channel figures identifying at least some of the plurality of additional picture frames;
    marking means for marking a specific symbol on either a desired one of the plurality of additional picture frames or a desired channel figure displayed on the screen;
    position monitoring means for monitoring positions of one of the displayed channel figures or the displayed plurality of additional picture frames, as well as positions of the marked symbol;
    picture selecting means for selecting one of the desired channel figures or one of the plurality of additional picture frames on the basis of the presence of the marked symbol within the channel figure table or within the desired frame; and
    picture exchange means for exchanging a current main picture frame for the picture frame selected by said picture selecting means on the basis of position information monitored by said position monitoring means.

2. A display device having a picture selector in which a plurality of input sub picture frames are simultaneously displayed together with an input master picture frame on a screen, comprising:
    cursor generating and display means for generating and displaying a cursor on one of said picture frames;
    cursor control means electrically connected to said display device for controlling the movement of said cursor over the screen;
    master/sub picture-frame processing means for processing the input master picture frame and the input sub picture frames to display the input master and input sub picture frames in a predetermined arrangement on the screen; and
    picture selecting means for selecting a desired one of the plurality of input sub picture frames by locating the cursor on a desired one using said cursor control means, and exchanging a current input master picture frame for the selected input sub picture frame to display the selected input sub picture frame as a main picture frame on the screen.

3. A display device having a picture selector in which a plurality of input sub picture frames are simultaneously displayed together with an input master picture frame on a screen, comprising:
    cursor generating and displaying means for generating a cursor and displaying the cursor on the screen;
    a remote control input device having manually operable cursor control means for controlling the movement of said cursor over the screen;
    video signal processing means for processing video signals of the input master picture frame to display the input master picture frame at a first predetermined area on the screen;
    sub picture frame processing means for processing video signals of the input sub picture frames to display the input sub picture frames at a second predetermined area on the screen; and
    picture selecting means for selecting a desired one of the plurality of input sub picture frames by locating the cursor on a desired one using said cursor control means, and exchanging a current input master picture frame for the selected input sub picture frame to display the selected input sub picture frame as a main picture frame on the screen.

* * * * *